Figure 1:
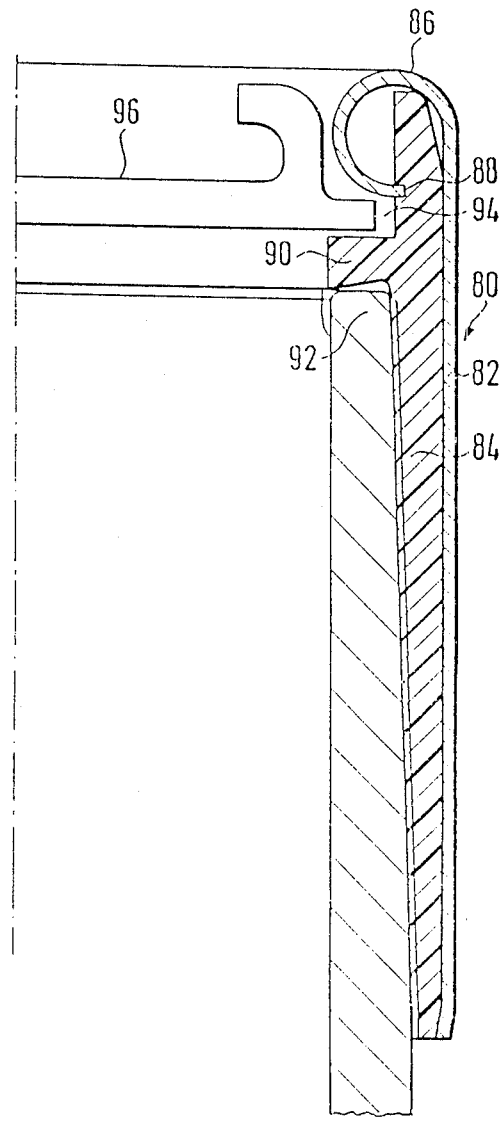

United States Patent [19]

Dreyfuss et al.

[11] Patent Number: 4,957,141
[45] Date of Patent: Sep. 18, 1990

[54] PIPE-END PROTECTOR

[75] Inventors: Wilfried Dreyfuss, Dorfstrasse 52, D-3111 Eimke, Fed. Rep. of Germany; Thomas E. Remp, 5555 Del Monte Dr., Houston, Tex.; Kurt Müller, Eicklingen, Fed. Rep. of Germany

[73] Assignees: Wilfried Dreyfuss, Eimke, Fed. Rep. of Germany; Thomas E. Remp, Houston, Tex.

[21] Appl. No.: 212,795

[22] Filed: Jun. 29, 1988

[51] Int. Cl.⁵ .................. B65D 59/06; F16L 55/10
[52] U.S. Cl. .................................. 138/89; 138/96 R
[58] Field of Search ............... 138/89, 96 R, 96 T

[56] References Cited

U.S. PATENT DOCUMENTS

| | | | |
|---|---|---|---|
| 1,692,710 | 11/1928 | Spahn | 138/96 T |
| 2,098,087 | 11/1937 | Engstrom | 138/96 T |
| 2,134,730 | 11/1938 | Osborn | 138/96 T |
| 2,215,829 | 9/1940 | Evans | 138/96 R |
| 2,316,013 | 4/1942 | Mulholland | 138/96 T |
| 2,691,992 | 10/1954 | Phillips | 138/96 T |
| 4,139,005 | 2/1979 | Dickey | 138/96 T |
| 4,210,179 | 7/1980 | Galef | 138/96 T |
| 4,337,799 | 7/1982 | Hoover | 138/96 T |
| 4,379,471 | 4/1983 | Kuenzel | 138/96 T |
| 4,487,228 | 12/1984 | Waldo et al. | 138/89 X |
| 4,582,090 | 4/1986 | Chase et al. | 138/89 X |
| 4,655,256 | 4/1987 | Lasota et al. | 138/96 T |
| 4,662,402 | 5/1987 | Dreyfuss et al. | 138/96 T |

FOREIGN PATENT DOCUMENTS

| | | | |
|---|---|---|---|
| 664372 | 5/1933 | Fed. Rep. of Germany | 138/96 R |
| 2800747 | 7/1978 | Fed. Rep. of Germany. | |
| 2939834 | 4/1981 | Fed. Rep. of Germany. | |
| 872393 | 6/1942 | France | 138/96 R |

*Primary Examiner*—James E. Bryant, III
*Attorney, Agent, or Firm*—Shlesinger & Myers

[57] ABSTRACT

A pipe-end protector depending on its being used as a cap or plug comprises a metal housing with a sleeve-like, elastomer inset or a metal plug with a sleeve-like, elastomer cover. To increase the strength of the protector, the metal housing or the metal plug —which always are tubular—are provided at their outer end with a flanged or folded, preferably rolled edge. To facilitate manufacture of the protector, the inset or the cover may consist of at least two part-cylindrical mating case-components.

1 Claim, 1 Drawing Sheet

PIPE-END PROTECTOR

The invention concerns a pipe-end protector.

Protectors consisting of a metal housing and an integral plastic inset, or of a metal plug and an integral sleeve-like cover have long been known; illustratively see the German Pat. No. 2,939,384 and the German Offenlegungsschrift 2,800,747. These devices incur the drawback that insets and covers must be made using comparatively expensive tools or molds where following injection, either the thread core must be turned out or the inset or cover must be screwed off the core. Molds with so-called drop cores are economical only for mass production because of their complex design.

Furthermore, plastic protectors having long been known.

Protectors with integral insets or covers and also protectors made of plastic moreover suffer from the drawback of being hard to disassemble, and even harder to assemble, at low temperatures on account of the contraction of the plastic. As a result substantial problems may be encountered when using such protectors for instance for petroleum pipes, which are used at much different temperatures, especially where large-diameter pipes are concerned.

Again protectors are known for which the metal housing of the meal plug is merely bent around at the upper edge to provide the protective cap or plug with greater strength. In many cases, especially with large-diameter pipes or with very heavy pipes, the strength no longer suffices to effectively protect the pipe end and the pipe threads against impacts.

Accordingly the object of the present invention is to so design a protector of the initially cited kind that greater strength is possible. Also, manufacture shall be made easier.

This problem is solved by the present invention. The manufacture is substantially eased by the designs of the present invention. Advantageous and appropriate further developments are stated herein.

Protectors of the type of the present invention are substantially stronger than protectors known heretofore, in particular on account of the flanged, or rolled, or folded edge.

On account of the design of the present invention the manufacture of the insert or cover is feasible using simple molds which are much more economical to make than those hitherto used in the state of the art. The molds merely need be equipped with ejector pins to eject the injection molding. As a result cooling and fabrication times are substantially reduced.

The metal housing and the metal stopper of the invention are equally advantageously applicable, whether integral or multi-part insets and covers are concerned.

The groove formed in the inset illustratively may be used to insert a bottom in order to turn an open protective cap into a closed one. Separate sealing elements also may be placed into the grooves. Instead of such sealing elements, injection-molded thin-walled strips also may be provided as axial sealing rings.

The further development of the present invention allows passing through accessory tool to assemble and disassemble the protectors. The bent-apart tongues reinforce the application surfaces of the accessory tool and simultaneously act as drivers for the plastic inset because resting against the lateral boundaries of the inset or of the cover.

The further development according to the present invention allows especially good axial fastening of the inset or cover to the metal unit.

The invention is elucidated below in relation to the attached drawing.

FIG. 1 is a cross-section of a protective cap 80 comprising a hollow-cylindrical metal housing 82 with an elastomeric, sleeve-like inset 84 resting tightly against the metal housing. The metal cylindrical 82 is provided at its outer end with an inward bent flanged edge 86. The inset 84 enters the flange of the edge 86 in such a manner that the inward bent part of the flanged edge overlaps the end of the inset and the free flange edge 88 engages the inset or rests against the inset in clamping manner. On the inside, the inset 84 comprises a peripheral stop 90 for the pipe end 92, a space 94 like a groove being left between the stop 90 and the flanged edge 86 of the metal housing 92 to receive in removable manner a snap-in elastic lid 96. The stop 90 is provided in the manner of the embodiment of FIG. 5 with a circumferential seal 30 to cover the sealing gap 32 between the stop and the pipe end 92.

Because of the special design of the flanged edge together with the inset or cover of FIG. 1, additional elements to secure against rotation and against dropping-out, (axially loose inset or cover), will not be needed. This securing against dropping-out or rotation is assured by the flanged edges engaging the elastomer of the inset or of the cover or by its clamping action.

We claim:

1. A protector for the threads of a pipe-end, comprising:
    (a) a longitudinally extending metallic tubular member;
    (b) an elastomeric sleeve adapted to engage the threads of a pipe-end and affixed co-axially and co-extensively relative to said tubular member, thereby forming a unit;
    (c) means for securing said sleeve to said tubular member;
    (d) said unit having first and second spaced end portions;
    (e) said unit first end portion including an annular groove;
    (f) an elastic lid removably secured to said annular groove;
    (g) said sleeve is disposed within said tubular member;
    (h) said tubular member including a first end portion curved inwardly;
    (i) said tubular member including an edge section extending transversely thereto and engaging an end portion of said sleeve, thereby securing said sleeve to said tubular member;
    (j) said sleeve including a radially extending annular flange adjacent said tubular member first edge section for engaging an end portion of the pipe-end; and
    (k) said flange is spaced from said tubular member edge section, thereby forming said annular groove.

* * * * *